Dec. 6, 1966                J. H. BEACH                3,289,232
         PUMP CONTROL, CHECK VALVE AND DRIVE COUPLING MEANS
                  FOR SHAMPOOING AND SCRUBBING DEVICE
Filed Dec. 28, 1964                                 4 Sheets-Sheet 3
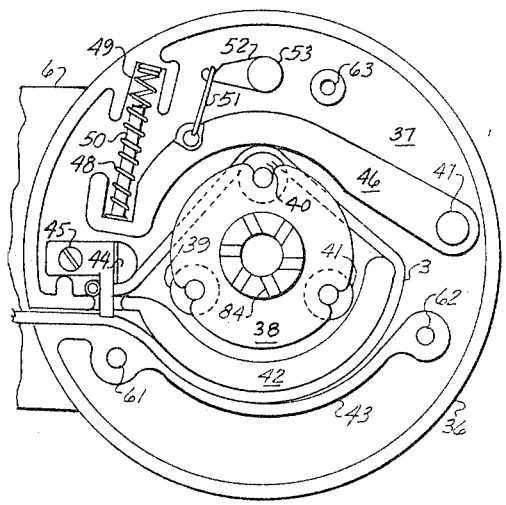
Fig. 5a
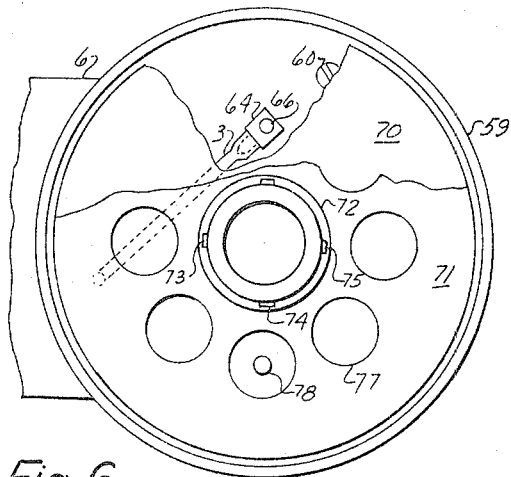
Fig. 6
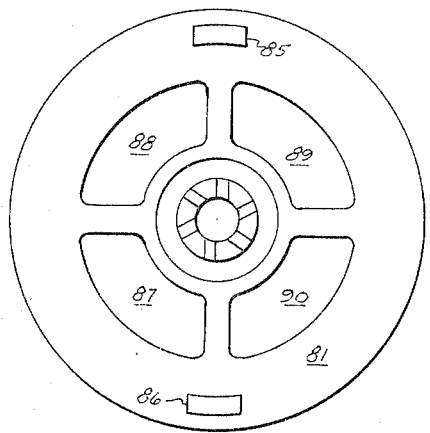
Fig. 7
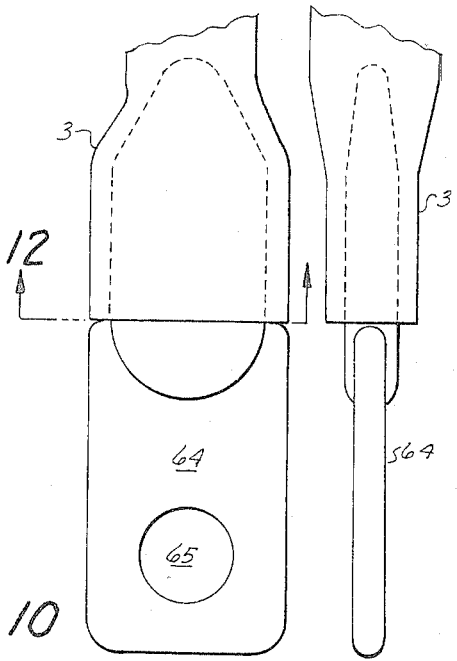
Fig. 10
Fig. 11
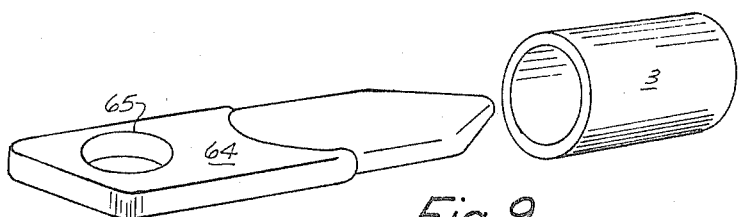
Fig. 9

United States Patent Office 3,289,232
Patented Dec. 6, 1966

3,289,232
PUMP CONTROL, CHECK VALVE AND DRIVE COUPLING MEANS FOR SHAMPOOING AND SCRUBBING DEVICE
Justice H. Beach, Canton, Ohio, assignor to The Hoover Company, North Canton, Ohio, a corporation of Ohio
Filed Dec. 28, 1964, Ser. No. 421,175
7 Claims. (Cl. 15—29)

The present invention relates to a control, check valve and drive coupling for a peristaltic type of pump in a shampoo-polishing device. In a hand-held shampooing device it is desirable to have a power operated pump incorporated therein for supplying detergent through a tube from a separate supply receptacle. It is advantageous to have a separate supply receptacle rather than a receptacle on the hand held device itself because a larger supply of cleaning liquid is readily available and the device itself is not so awkward to manipulate. With a pump incorporated in the device it is very advantageous to have a simple pump control which the user can operate with only one finger of the hand holding the device to turn the supply of cleaning liquid on and off at will. In a shampoo-polishing device having a pump incorporated therein it is desirable that the pump be disconnected when the device is used as a polisher to prevent unnecessary wear on the pump mechanism. The pump of the present invention is of the peristaltic type wherein a flexible tube is progressively compressed by rollers to suck liquid through the tube from a supply receptacle. In such a pump it is desirable to have a valve for preventing liquid from flowing out of the tube and back into the supply receptacle when the pump is not operating.

Therefore, it is an object of this invention to provide a control for a peristaltic type of pump which is simple to operate and has a safety feature for preventing pump damage from abuse by the user.

It is another object of this invention to provide a novel check valve for the end of an elastomeric tube which is simple in construction, and very easy to assemble and use.

It is a further object of this invention to provide a novel separable coupling drive between a pump and a brush back on a shampooing and scrubbing tool which advantageously saves wear on the pump when the tool is being used for polishing alone.

Other objects and advantages of the present invention will be readily apparent to those skilled in the art as the description proceeds when taken in connection with the accompanying drawings wherein:

FIGURE 5a is a partial bottom plan view taken in the direction of arrows 5—5 of FIGURE 4 and showing the pump control in operative position.

FIGURE 6 is a view taken in the direction of arrows 6—6 of FIGURE 4 with portions cut away for clarity.

FIGURE 7 is a view taken in the direction of arrows 7—7 of FIGURE 4.

FIGURE 9 is a perspective view showing the check valve of the present invention.

FIGURE 10 is a top plan view showing the check valve in place.

FIGURE 11 is a side view showing the check valve in place.

Figure 1:
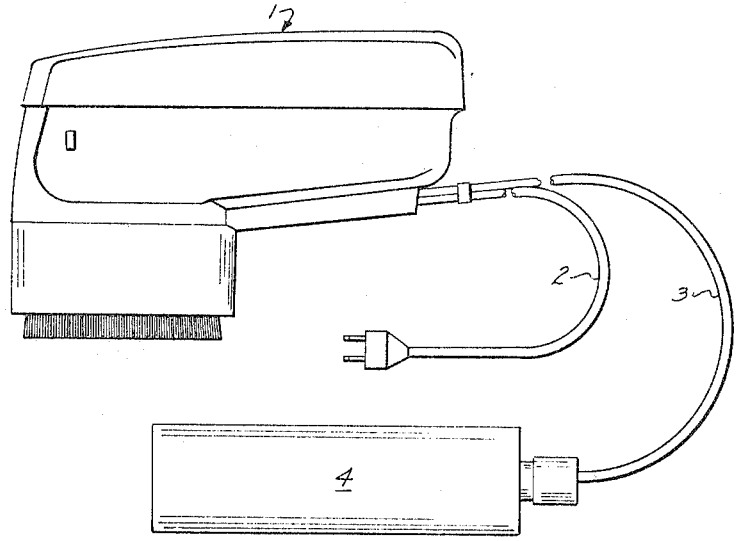
FIGURE 1 is a side elevational view of a shampooing and scrubbing device having the features of the present invention embodied therein.

Referring now to the drawing FIGURE 1 shows a shampooing and scrubbing tool 1 having the features of the present invention embodied therein. The tool has a power cord 2 connected thereto and a liquid supply tube 3 leading to a supply receptacle 4. Tube 3 is of elastomeric material such as rubber or vinyl composition or the like. The shampooing and scrubbing device of the present invention has upper and lower casing sections 5 and 6 which are secured together by screws 7 and 8. All of the operative elements of the device are mounted in or on lower casing section 6 and upper casing section 5 merely serves as a cover. A combined motor and motor supporting frame 9 is secured to the inside of lower casing section 6 by screws 10 and 11 which are threaded into bored projections as at 12 in FIGURE 2 extending upward from the bottom of lower casing section 6. The motor armature shaft projects forwardly of combined motor and motor mounting frame 9, and has worm gear threads formed thereon to define a worm gear 13. The motor supporting frame has a vertically bored cylindrical enlargement 14 formed thereon for receiving a worm wheel gear mounting shaft 15 with a press fit. Worm wheel gear 16 is mounted on sleeve bearing 17 on shaft 15 and is held thereon by a lock washer 18. Gear 16 is driven by worm gear 13 and lower gear portion 19 of worm wheel gear 16 meshes with gear 20 on brush shaft 21. Brush shaft 21 and sleeve bearing 22 are received in a bored projection 23 extending upwardly from the bottom of lower casing section 6. The bottom end of worm wheel gear munting shaft 15 extends through enlargement 14 on the motor supporting frame and is received in a recess formed in projection 24 extending upwardly from lower casing section 6. This arrangement accurately positions lower portion 19 of worm wheel gear 16 in proper meshing engagement with brush shaft gear 20.

Figure 2:
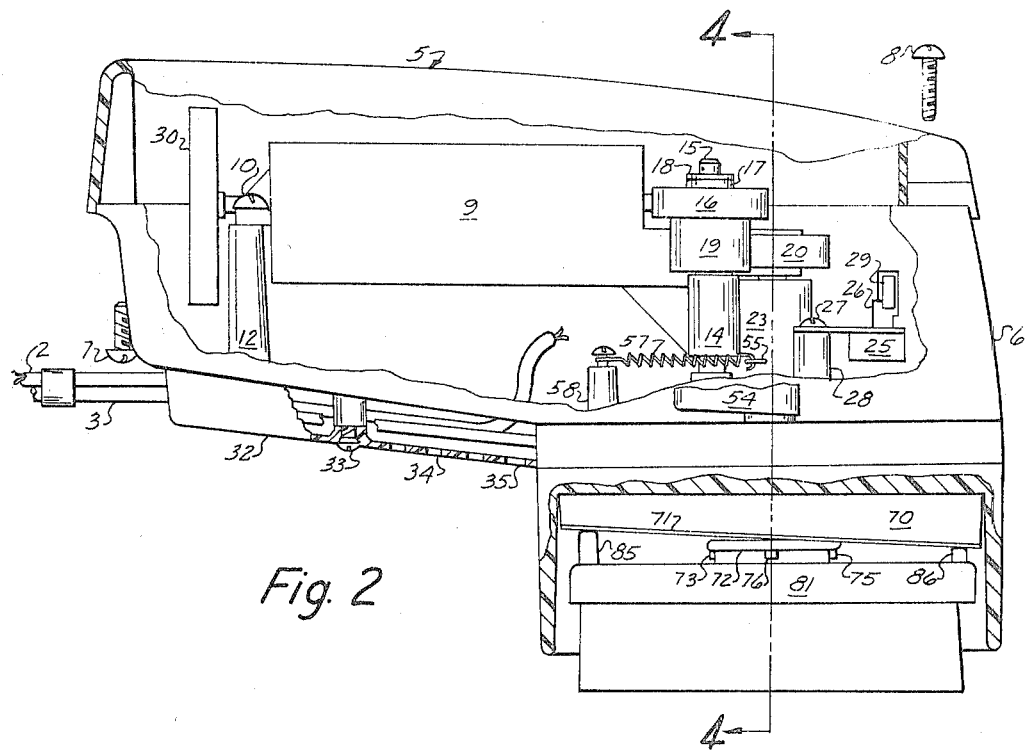
FIGURE 2 is a side elevational view of a shampooing and scrubbing device with portions cut away for clarity.
Figure 3:
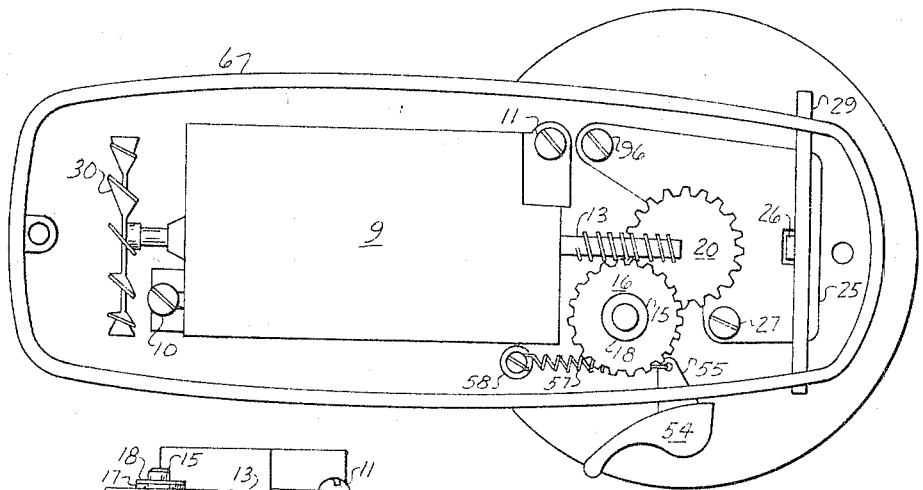
FIGURE 3 is a top view of a shampooing and scrubbing device with the top cover removed for clarity.

In the front part of lower casing section 6 a switch 25 is secured as by screws 96 and 27 which are threaded into recessed projections extending upwardly from lower casing section 6. Only one of the projections is shown at 28 in FIGURE 2. Switch 25 has a slide button 26 which is received in a notch formed in the bottom edge of switch actuating rod 29. Rod 29 extends completely across lower casing section 6 as shown in FIGURE 3 and has its ends projecting through suitable holes formed in the sidewalls of lower casing section 6. Pushing axially on one end or the other of rod 29 with the thumb or finger moves the rod axially and in turn moves slide button 26 of switch 25 to activate or deactivate the motor.

Mounted on the rear end of the motor armature shaft is a cooling air fan 30 which pulls air through opening 31 in the bottom of lower casing section 6 and exhausts it through slots (not shown) in the rear of top casing section 5. Member 32 is secured to the outside bottom of lower casing section 6 by screw 33 to hide opening 31, and to cover the power cord 2 and liquid supply tube 3 where they extend along the exterior of lower casing section 6. Slots as at 34 and 35 in member 32 permit air to enter opening 31.

Figure 4:
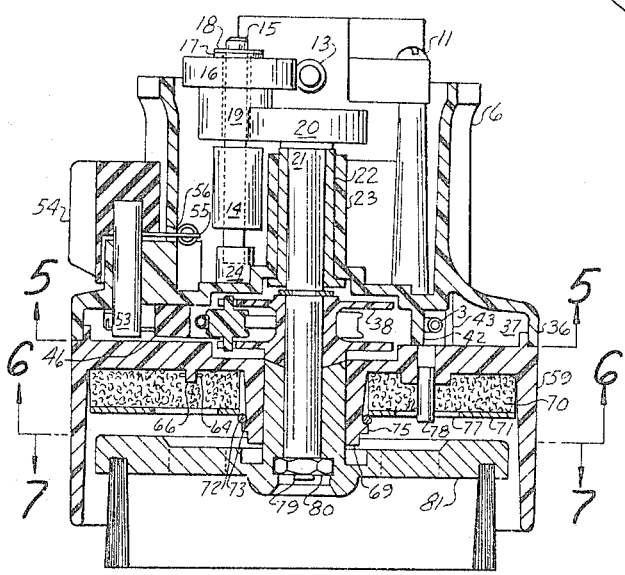
FIGURE 4 is a sectional view taken in the direction of arrows 4—4 of FIGURE 2.
Figure 5:
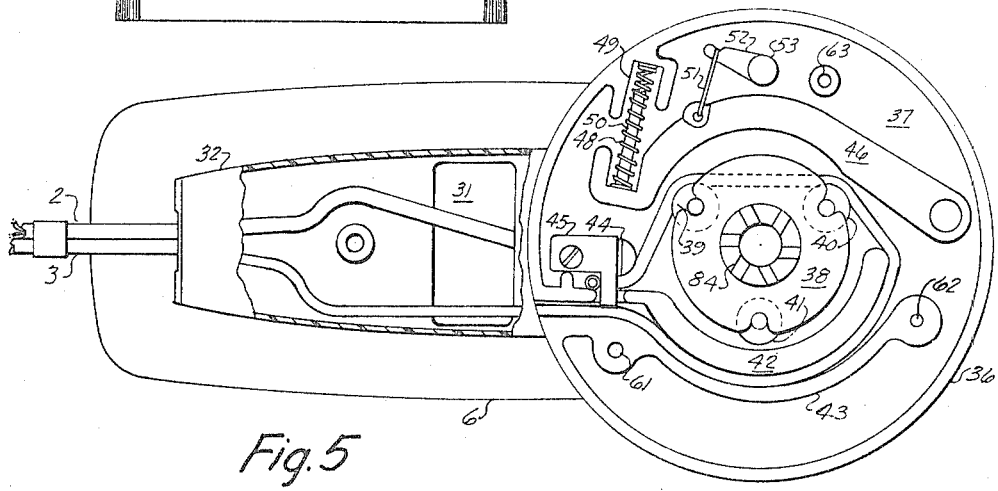
FIGURE 5 is a bottom plan view taken in the direction of arrows 5—5 of FIGURE 4 and showing the pump control out of operative position.

As shown in FIGURES 3–5 the front outside bottom of lower casing section 6 is circular in plan and has a flange 36 depending therefrom to define a pump receiving space 37. A pump rotor 38 is received on shaft 21 in space 37. Rotor 38 is freely rotatable on shaft 21, and has rollers 39, 40 and 41 rotatably mounted on pins on the periphery of rotor 38. Liquid supply tube 3 enters space 37 through an opening in flange 36 and is trained through a channel defined by walls 42 and 43 projecting into space 37 from casing section 6. Tube 3 is then trained around rotor 38, past an abutment 44 and beneath a clamping member 45 which is secured to casing section 6 by a screw. Clamping member 45 holds tube 3 against axial movement but does not collapse the tube closed. An arcuate member 46 is pivotally mounted on projection 47 in space 37 for movement toward and away from rotor 38. A coil spring 48 is trapped between arcuate member 46 and a channeled recess 49 for biasing member 46 toward rotor 38. A rod 50 inside of spring 48 prevents the spring from bowing sideways. A U-shaped member 51 has one end received in a hole in arcuate member 46 and the other end received in a notch in lateral extension 52 on finger lever shaft 53. Shaft 53 is rotatably mounted in a vertical bore through casing section 6 as shown in FIGURE 4 and a finger lever 54 is fixed on the top end of shaft 53. A flat arm member 55 is also secured to shaft 53 below finger lever 54 and projects through a slot 56 in casing section 6. A coil spring 57 is secured to arm 55 and to a post 58 on casing section 6 as shown in FIGURE 2. The pulling force of spring 57 on arm 55 exerts a clockwise moment on shaft 53 as viewed in FIGURE 5. The moment is transmitted through extension 52 and member 51 to arcuate member 46. The force of spring 57 is greater than that of spring 48 so that spring 57 normally holds arcuate member 46 away from rotor 38 in a position as shown in FIGURE 5. When finger lever 54 is rotated by pressing on it with a finger the force of spring 57 is overcome and shaft 53 is rotated in a counterclockwise direction as viewed in FIGURE 5a. This frees spring 48 to force arcuate member 46 toward rotor 38 and compresses tube 3 between arcuate member 46 and rollers 39–41 on rotor 38. Thus, operation of the pump is started and stopped simply by pushing and releasing finger lever 54. It is to be noted that the force applied to finger lever 54 by the operator is not transmitted directly to arcuate member 46. This prevents undue wear and damage to tube 3 and the other pump parts which might occur if an operator applied excessive force in moving arcuate member 46 toward rotor 38. With the present arrangement arcuate member 46 is resiliently biased toward rotor 38 by spring 48 and this provides proper operation of the pump regardless of the amount of force applied to finger lever 54 by an operator.

Figures 12, 12A:
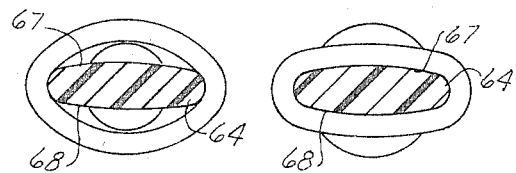
FIGURE 12 is a sectional view taken in the direction of arrows 12—12 of FIGURE 10 and showing the valve in closed condition.
FIGURE 12a is a sectional view taken in the direction of arrows 12—12 of FIGURE 10 and showing the valve in open position.

As shown in FIGURE 4 a shroud member 59 is secured over flange 36 to close space 37. Shroud 59 is held in place by screws, only one of which is shown at 60 in FIGURE 6, threaded into holes 61, 62 and 63 formed in projections in space 37 as shown in FIGURE 5. Tube 3 extends from beneath clamping member 44 in space 37 through a hole in shroud member 59 and along the inside top wall of the shroud as shown in FIGURE 6. Inserted into the outlet end of tube 3 is a check valve member 64. The rear end of valve 64 serves as a grasping tab for inserting the forward end into tube 3, and also serves as an anchor for valve 64 and the outlet end of tube 3 by means of hole 65 which is tightly fitted over a projection 66 extending down from the inside top wall of shroud 59. As shown in FIGURE 10 the width of the forward portion of valve 64 is substantially greater than the inside diameter of tube 3. When valve 64 is inserted into the end of tube 3 the tube is stretched considerably and the tendency of the tube to return to its original shape causes tight frictional engagement between the tube and the side edges of the forward portion of valve 64. As shown in FIGURE 12 the thickness of the forward portion of valve 64 is less than the internal diameter of tube 3, and the opposite faces 67 and 68 are curved outward slightly from one side edge to the other. The side edges of the forward portion of valve 64 are also curved outward slightly so that the forward portion of the valve has no straight surfaces and no inwardly curved surfaces. Thus, the interior surface of tube 3 tightly hugs the forward portion of valve 64 and prevents air leakage into tube 3 past valve 64. When a positive pressure is built up inside tube 3 the portions of the tube hugging faces 67 and 68 of valve 64 are stretched outward as shown in FIGURE 12a and fluid will flow past check valve 64. The tip of the forward portion of valve 64 is tapered as shown in FIGURES 9–11 to facilitate insertion of valve 64 into the end of tube 3. The present arrangement provides a novel check valve which is not subject to deterioration or malfunctioning even after long continued operation.

Figure 8:
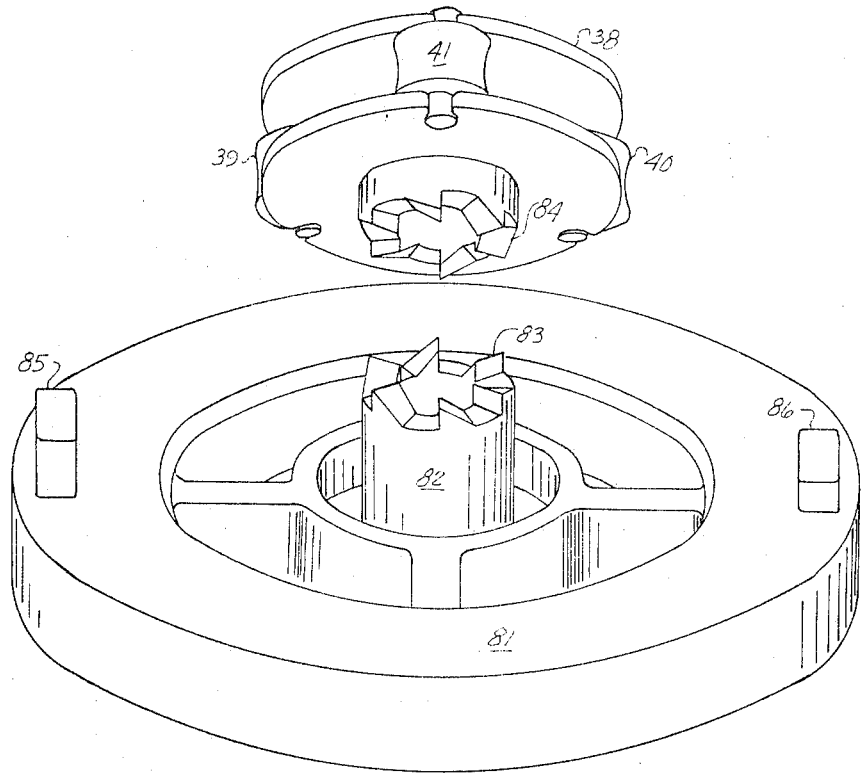
FIGURE 8 is a perspective view showing the separable coupling drive between the brush back and the pump rotor.

Shroud 59 is formed with a vertically bored centrally located projection 69 as shown in FIGURE 4. A circular piece of urethane foam sponge 70 is placed within shroud 59 as shown in FIGURES 4 and 6. A flat circular wobble plate 71 is also placed over projection 69 and within shroud 59 against sponge 70. A split ring 72 snaps over lugs 73–76 on projection 69 to hold wobble plate 71 in place. As shown in FIGURE 6 wobble plate 71 has a plurality of holes formed therein, only one of which is referenced by a numeral 77. A pin 78 tightly fitted in a hole in the top wall of shroud 59 projects through sponge 70 and hole 77 in wobble plate 71 to prevent relative rotation between the sponge and shroud, and between the sponge and wobble plate. The terminal end 79 of shaft 21 is formed with screw threads for receiving a trapped nut 80 in brush 81. As best shown in FIGURE 8 brush 81 has an elongated hub portion 82 with gear teeth 83 formed thereon. Teeth 83 on brush 81 engage with teeth 84 on pump rotor 38. To place teeth 83 and 84 in driving engagement brush 81 is rotated by hand and threaded slightly onto end 79 of shaft 21. The motor is then turned on to rotate shaft 21 and brush 81 is held against rotation. This causes nut 80 to thread all the way up on threaded end 79 of shaft 21 which moves brush 81 axially upward and draws teeth 83 into meshing engagement with teeth 84. When the device 1 is used only for polishing or the like brushes without an elongated hub and teeth are used so that pump rotor 38 is not rotated and unnecessary wear on the pump parts is eliminated. Projections 85 and 86 are formed on the back of brush 81 with projection 85 being substantially higher than projection 86. As brush 81 is rotated projection 85 causes wobble plate 71 to wobble which in turn causes sponge 70 to be compressed and expanded.

In operation, the device is turned on and the pump is selectively operated by finger lever 54 to draw detergent solution through tube 3 from receptacle 4 and past check valve 64 into sponge 70. The compression and expansion of sponge 70 causes the detergent solution to foam or form suds. The foam passes from sponge 70 through openings 77 in wobble plate 71 and then through openings 87–90 in the back of brush 81. Check valve 64 prevents liquid in tube 3 from draining back into receptacle 4 as the device is usually at a higher elevation than receptacle 4 which is normally on the floor.

It will be recognized that the features of the present invention provide a scrubbing device having novel control for a peristaltic type of pump which is very simple in operation and protects the pump against abuse by an operator. In addition, the novel check valve is very economical to produce and easy to assemble, and the absence of moving parts provides long life. The separable coupling drive between the pump and brush advantageously reduces wear on the pump and prevents operation of the pump when the device is used for polishing alone.

It is to be understood that the embodiment of the invention described herein is only illustrative and is not to be taken in a limiting sense. The present invention includes all equivalent variations of the embodiment disclosed and is limited only by the scope of the claims.

I claim:
1. A shampooing and scrubbing device comprising:
   (a) a casing,
   (b) a shaft rotatably mounted on said casing,
   (c) scrubbing means mounted on said shaft,
   (d) power means for rotating said shaft,
   (e) a liquid pump including movable actuating means mounted on said device,
   (f) said pump having an inlet and an outlet,
   (g) said pump inlet being adapted to be connected to a liquid supply receptacle,
   (h) said pump outlet being positioned adjacent said scrubbing means for supplying liquid to a surface being scrubbed,
   (i) a check valve in said pump outlet,
   (j) selective control means for starting and stopping the flow of liquid through said pump, and
   (k) a separable coupling drive between said pump actuating means and said scrubbing means,
   (l) said separable coupling drive being automatically engaged when said scrubbing means is mounted on said shaft and being automatically disengaged when said scrubbing means is removed from said shaft.

2. The device of claim 1 wherein said pump is of the peristaltic type in which an elastomeric tube is continuously progressively compressed by rotatable contact means against an arcuate backing member which is pivotally mounted for movement toward and away from said contact means, said selective control means comprising;
   (a) first resilient means applying a holding force to said backing member and normally holding said backing member in a non-pumping position away from said contact means so that said tube is not compressed,
   (b) manually actuatable releasing means for releasing said holding force applied to said backing member by said first resilient means, and
   (c) second resilient means applying a biasing force to said backing member and biasing said backing member to a pumping position toward said contact means so that said tube is compressed when said releasing means is actuated,
   (d) said first resilient means automatically returning said backing member to said non-pumping position when said releasing means is deactuated.

3. A scrubbing device comprising;
   (a) casing,
   (b) a shaft rotatably mounted on said casing,
   (c) power means for rotating said shaft,
   (d) a liquid pump mounted on said device for supplying liquid to a surface being scrubbed, said pump including movable actuating means,
   (e) pump drive means movably mounted on said device and drivingly connected with said shaft,
   (f) separable coupling drive means on said pump actuating means and said pump drive means whereby said pump actuating means is driven through said separable coupling drive by said pump drive means when said shaft is rotated and said separate coupling drive is engaged, and
   (g) scrubbing means removably mounted on said shaft,
   (h) said scrubbing means cooperating with said pump drive means to automatically engage said separable coupling drive when said scrubbing means is mounted on said shaft and to automatically disengage said separable coupling drive when said scrubbing means is removed from said shaft.

4. The device of claim 3 wherein said pump drive means is on said scrubbing means.

5. The device of claim 4 wherein said separable coupling drive comprises cooperative meshing gear teeth formed on said pump actuating means and said pump drive means.

6. The device of claim 5 wherein said pump actuating means comprises the rotor of a peristaltic pump.

7. In a peristaltic type of pump including a rotatably mounted rotor having tube compressing means thereon, a pivotally mounted backing member having a concave arcuate portion adjacent to and facing the path defined by said tube compressing means when said rotor is rotated, and an elastomeric tube positioned between said tube compressing means and said concave arcuate portion of said backing member, the improvement comprising;
   (a) first resilient means applying a holding force to said backing member and normally holding said backing member in a non-pumping position away from said tube compressing means so that said tube is not compressed,
   (b) manually actuatable control means for releasing said holding force applied to said backing member by said first resilient means,
   (c) second resilient means applying a biasing force to said backing member and biasing said backing member to a pumping position toward said tube compressing means so that said tube is compressed when said control means is actuated,
   (d) said first resilient means automatically returning said backing member to said non-pumping position when said control means is deactuated.

References Cited by the Examiner

UNITED STATES PATENTS

| | | | |
|---|---|---|---|
| 2,003,215 | 5/1935 | Nadig | 15—320 |
| 2,098,886 | 11/1937 | Stafford | 137—525 |
| 2,434,802 | 1/1948 | Jacobs | 103—149 |
| 2,585,863 | 2/1952 | Smith | 137—525 |
| 2,731,659 | 1/1956 | Coplen | 15—320 |
| 3,056,151 | 10/1962 | Vlacancich | 15—29 |
| 3,140,666 | 7/1964 | Currie | 103—149 |
| 3,153,799 | 10/1964 | Williams | 15—29 |
| 3,212,117 | 10/1965 | Ernstberger | 15—50 |

CHARLES A. WILLMUTH, *Primary Examiner.*

E. L. ROBERTS, *Assistant Examiner.*